US008924779B2

United States Patent
Nation et al.

(10) Patent No.: US 8,924,779 B2
(45) Date of Patent: Dec. 30, 2014

(54) PROXY RESPONDER FOR HANDLING ANOMALIES IN A HARDWARE SYSTEM

(75) Inventors: George Wayne Nation, Rochester, MN (US); Gary M. Lippert, Kasson, MN (US); Srinivasa Rao Kothamasu, Bangalore (IN)

(73) Assignee: LSI Corporation, Milpitas, CA (US)

( * ) Notice: Subject to any disclaimer, the term of this patent is extended or adjusted under 35 U.S.C. 154(b) by 301 days.

(21) Appl. No.: 13/435,613

(22) Filed: Mar. 30, 2012

(65) Prior Publication Data

US 2013/0262918 A1  Oct. 3, 2013

(51) Int. Cl.
*G06F 11/00* (2006.01)

(52) U.S. Cl.
USPC .......................................................... 714/10

(58) Field of Classification Search
USPC .......................................................... 714/10
See application file for complete search history.

(56) References Cited

U.S. PATENT DOCUMENTS

| 5,450,578 | A  | * | 9/1995 | Mackenthun | 714/4.2 |
| 5,828,569 | A  | * | 10/1998 | Fisher | 700/82 |
| 6,820,157 | B1 | * | 11/2004 | Eide et al. | 710/303 |
| 7,162,654 | B1 | * | 1/2007 | Price | 713/320 |
| 8,281,308 | B1 | * | 10/2012 | Cheng et al. | 718/100 |
| 2003/0037278 | A1 | * | 2/2003 | Olarig | 714/5 |
| 2003/0110205 | A1 | * | 6/2003 | Johnson | 709/104 |
| 2004/0078647 | A1 | * | 4/2004 | Das Sharma et al. | 714/7 |
| 2004/0216002 | A1 | * | 10/2004 | Fromherz et al. | 714/25 |
| 2013/0198562 | A1 | * | 8/2013 | Anthonisamy et al. | 714/6.21 |

* cited by examiner

*Primary Examiner* — Bryce Bonzo
(74) *Attorney, Agent, or Firm* — Sheridan Ross P.C.

(57) ABSTRACT

An apparatus for handling anomalies in a hardware system including a master device and at least one slave device coupled with the master device through an interconnect device is provided. The apparatus includes at least one controller operative to receive status information relating to the slave device. The status information is indicative of whether an anomaly is present in the slave device and/or the interconnect device. The controller is operative to generate output response information as a function of the status information relating to the slave device for detecting and/or responding to hardware system anomalies in a manner which reduces a need for resetting the hardware system to return to normal operation.

23 Claims, 5 Drawing Sheets

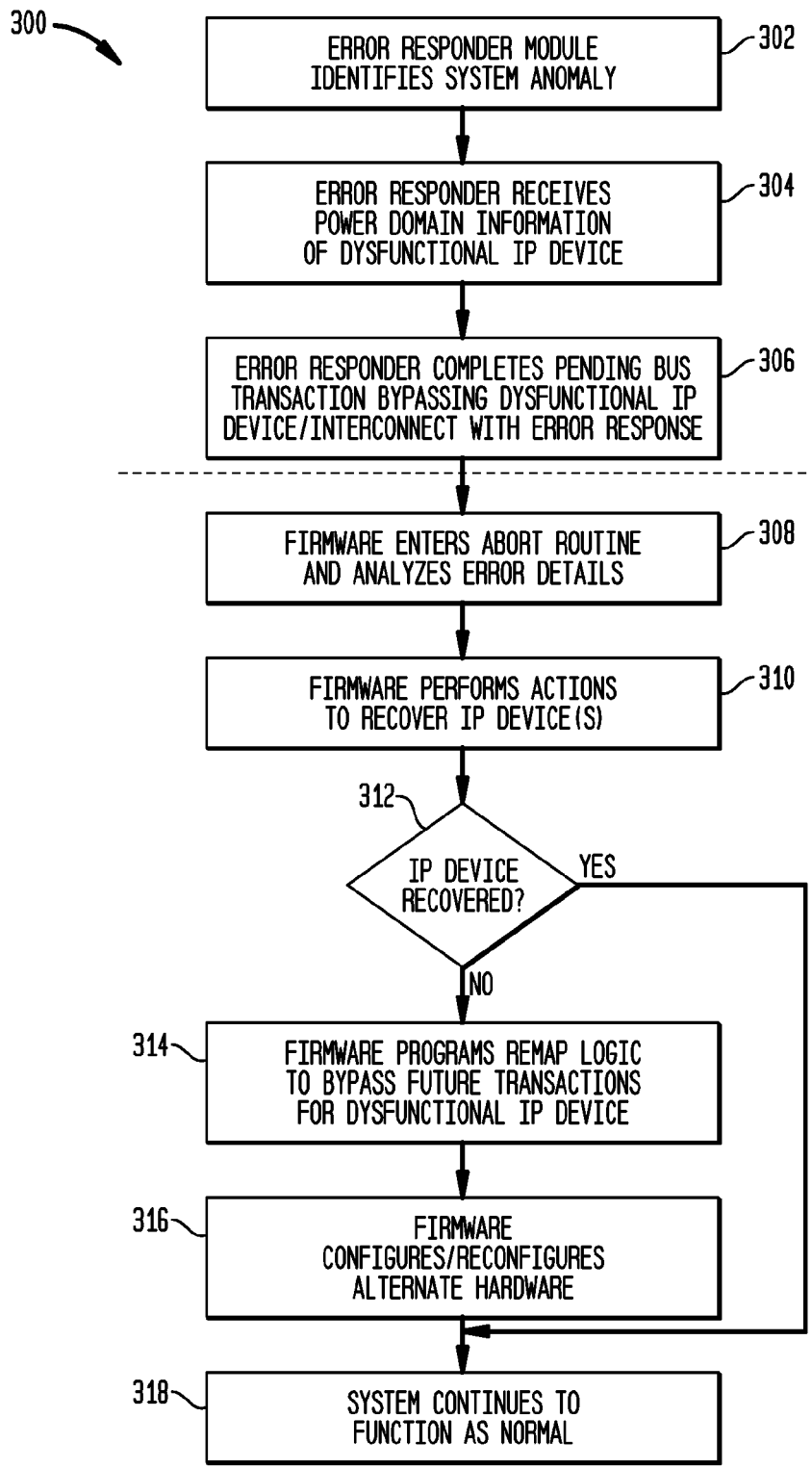

PROXY RESPONDER FOR HANDLING ANOMALIES IN A HARDWARE SYSTEM

BACKGROUND

Most embedded systems need to be self-reliant; it is not practical to wait for a user to intervene and reboot the system when an anomaly is encountered. Such system anomalies may include, but are not limited to, software or hardware (e.g., bus) experiencing a bus hang event, deadlocks, peripheral device failures, etc. In a typical hardware system, such as, for example, a system-on-chip (SoC) interconnect, data processing system, etc., system anomalies are generally handled through a system reset procedure.

A watchdog timer is often used to detect system anomalies and reset a system processor when such anomalies occur. Generally, a watchdog timer is a piece of hardware, often built into a microcontroller or other processor, that has the ability to initiate a system reset when it determines that the system has hung or is no longer executing a correct sequence of code. A watchdog timer is often based on a counter that counts down from some predetermined initial value to zero (or likewise, counts up from zero to a predetermined final value). Embedded software typically selects the counter's predetermined initial value (or final value in the case of a count-up scheme) and periodically services (e.g., restarts) the counter before it approaches zero, or an alternative predetermined final value. If the counter ever reaches its predetermined value before being restarted, a system malfunction is presumed to have occurred and the processor's, or the SoC's, reset line is asserted.

Once a system reset occurs, however, there is typically a considerable recovery time for the system to begin functioning normally. The recovery time is generally a function of a length of the watchdog timeout period plus the time it takes the system to reset and perform its initialization, which varies based, at least in part, on the amount of persistent data required. Because the recovery time causes significant delay in the system, performing a reset of the system is undesirable.

Systems typically include a default slave device which receives any core accesses to undefined system memory. However, accesses to undefined memory are typically static errors attributable to software and are not due to transient hardware conditions. Such undefined accesses are typically handled in systems by routing all undefined addresses to the default slave device. The default slave returns an error condition to a corresponding master device and software for recovery. Such accesses could be considered system anomalies.

SUMMARY

Principles of embodiments of the invention provide a novel mechanism for detecting and responding to hardware system anomalies, such as relating to malfunctioning Intellectual Property (IP) devices, in a manner which eliminates or at least reduces the need for resetting the system to return to normal operation. Embodiments of the invention provide a proxy responder for use in a hardware system which is operative to dynamically isolate malfunctioning devices in response to detection of a system anomaly, rather than automatically asserting the processor reset line. In this manner, embodiments of the invention advantageously reduce the recovery time of the system when an anomaly occurs.

In accordance with an embodiment of the invention, an apparatus for handling anomalies in a hardware system including a master device and at least one slave device coupled with the master device through an interconnect device is provided. The apparatus includes at least one controller operative to receive status information relating to the slave device. The status information is indicative of whether an anomaly is present in the slave device and/or the interconnect device. The controller is operative to generate output response information as a function of the status information relating to the slave device for detecting and/or responding to hardware system anomalies in a manner which reduces a need for resetting the hardware system to return to normal operation.

In accordance with another embodiment of the invention, a method for handling anomalies in a hardware system, including a master device and one or more slave devices coupled with the master device through an interconnect device, includes the steps of: identifying an anomaly in the hardware system based at least in part on status information relating to the one or more slave devices in the system; and generating output response information as a function of the status information for at least one of identifying a dysfunctional slave device and responding to a hardware system anomaly in a manner which reduces a need for resetting the hardware system to return to normal operation.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3 is process flow diagram depicting at least a portion of an exemplary method 300 for handling anomalies in a hardware system, according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative apparatus and methods for detecting and responding to anomalies in a hardware system (e.g., system-on-chip (SoC) interconnect). It should be understood, however, that embodiments of the invention are not limited to these or any other methods and/or apparatus. While embodiments of the invention may be described herein with specific reference to intellectual property (IP) devices or protocols in general, it is to be understood that embodiments of the invention are not limited to use with IP devices, and that aspects of embodiments of the invention may be employed with other device types, protocols, and/or hardware systems, as will become apparent to those skilled in the art. Moreover, it will become apparent to the skilled artisan given the teachings herein that numerous modifications can be made to the embodiments shown that are within the scope of the claimed invention. That is, no limitations with respect to the embodiments shown and described herein are intended or should be inferred.

The terms "IP core," "IP device," "IP block," or simply "IP," as used herein, are intended to refer broadly to reusable units of logic, data, cells, and/or chip layout designs that are the intellectual property of one or more parties and may be licensed to another party or owned and used exclusively by a single party. As known by those skilled in the art, IP cores, which are often used as building blocks within application-specific integrated circuit (ASIC) chip designs or field programmable gate array (FPGA) logic designs, generally fall into one of three types; namely, hard cores, firm cores, or soft cores. Hard cores are physical manifestations of the IP design and are well-suited for plug-and-play applications; hard cores are less portable and flexible than the other two types of cores. Like hard cores, firm cores also carry placement data but are configurable to various applications. The most flexible of the three, soft cores exist either as a netlist (i.e., a list of logic gates and associated interconnections making up an integrated circuit) or hardware description language (HDL) code.

Figure 1:
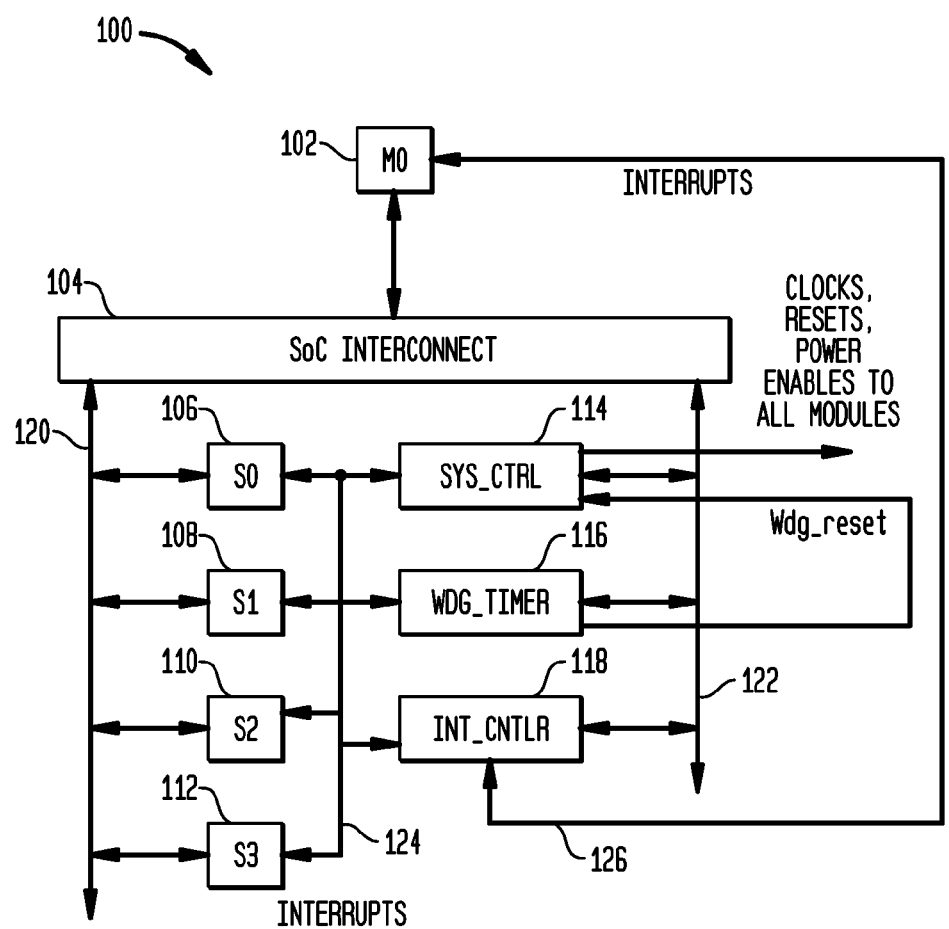
FIG. 1 is a block diagram depicting at least a portion of an exemplary hardware system which can be modified to implement techniques of embodiments of the invention.

FIG. 1 is a block diagram depicting at least a portion of an exemplary hardware system 100 which can be modified to implement aspects of embodiments of the invention. System 100 includes a master device (M0) 102 coupled with a plurality of slave devices (i.e., slaves) via an SoC interconnect 104. Specifically, the SoC interface 104 is coupled with a first slave device (S0) 106, a second slave device (S1) 108, a third slave device (S2) 110, a fourth slave device (S3) 112, a fifth slave device (SYS_CTRL) 114, a sixth slave device (WDG_TIMER) 116, and a seventh slave device (INT_CNTLR) 118 via one or more buses 120 and 122, or alternative interfaces. All slaves are accessed by the master device 102 through the SoC interconnect 104.

Each of at least a subset of the plurality of slave devices 106 through 118 may have a dedicated function(s) associated therewith. In this illustrative embodiment, for example, slave device 118 is operative as an interrupt controller for routing interrupts generated by all other slave devices to the master device 102; a first interrupt bus 124 coupled to each of the slave devices 106 through 116 is used to receive interrupts from the other slave devices and a second interrupt bus 126 connects the interrupt controller 118 with the master device 102. Slave device 114 is operative as a system control module for generating clock, reset and power enable signals to both the master and slave and/or interconnect devices. Slave device 116 is operative as a watchdog timer which generates a reset signal that is passed to the system control module 114 for resetting the system 100 to return the system to a normal state if an anomaly is detected in the system.

By way of example only, consider a bus hang event which occurs desultorily upon the master device 102 accessing the slave device 108. In this scenario, a processor in the master device 102, or alternative controller coupled to the master for executing instructions, will not be able to execute subsequent instructions, and the processor pipeline will be halted. This results in a deadlock condition whereby no active functionality is performed by the processor. Furthermore, since the processor does not perform any active functionality, the watchdog timer 116 interrupt event is not serviced on its next regular interval. As a result, the watchdog timer 116 begins to count for a predetermined period of time, after which the watchdog timer initiates a reset signal (Wdg_reset) which is sent to the system control module 114. Upon receiving the reset signal from the watchdog timer 116, the system control module 114 routes the reset signal to all system modules (master and slave and/or interconnect devices) to force the system 100 into a normal state as part of a system recovery process. Unfortunately, however, the reset initiated by the watchdog timer 116 also has the effect of clearing error status information (e.g., error logs, etc.) stored by the system, thereby hindering system debugging and fault location efforts.

Figure 2A:
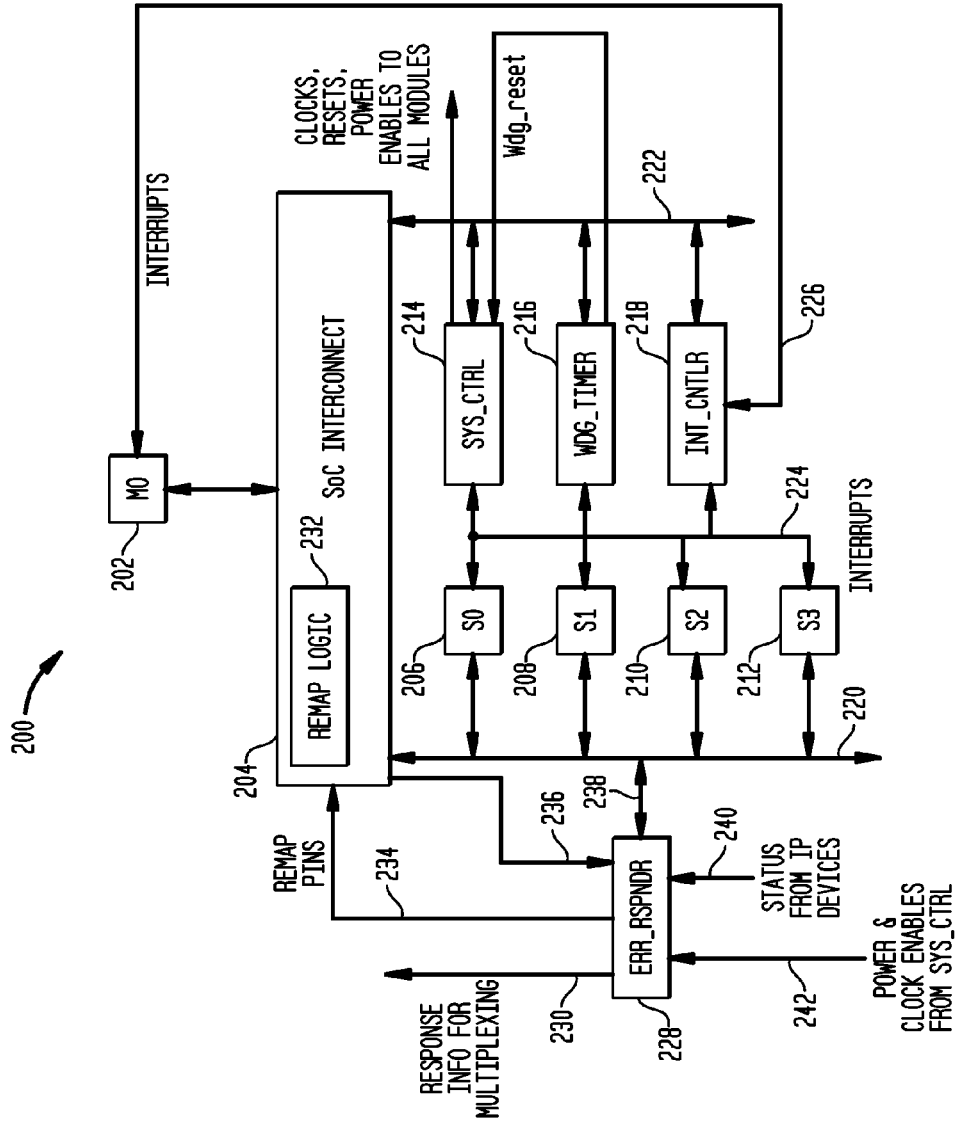
FIG. 2A is a block diagram depicting at least a portion of an exemplary hardware system, according to an embodiment of the invention.

With reference now to FIG. 2A, a block diagram depicts at least a portion of an exemplary hardware system 200, according to an embodiment of the invention. System 200 includes a master device (M0) 202 coupled with a plurality of slave devices (i.e., slaves) via an SoC interconnect 204. Specifically, the SoC interface 204 is coupled with a first slave device (S0) 206, a second slave device (S1) 208, a third slave device (S2) 210, a fourth slave device (S3) 212, a fifth slave device (SYS_CTRL) 214, a sixth slave device (WDG_TIMER) 216, and a seventh slave device (INT_CNTLR) 218 via corresponding buses 220 and 222. All slave devices 206 through 218 are accessed by the master device 202 through the SoC interconnect 204. It is to be understood that embodiments of the invention are not limited to any specific number of interconnects or master and slave devices in the system 200.

The SoC interconnect functions essentially as a bus matrix which, as the term is used herein, is intended to refer broadly to a module or other functional unit comprising several buses in parallel which can support concurrent high bandwidth data paths. Unlike in traditional shared bus architectures, arbitration in the bus matrix is for paths from masters to slaves or slaves to masters, rather than for devices (slaves). Two or more transactions or bus transfers can occur in parallel as long as they don't have any common path segments. Paths between devices (e.g., master to slave or slave to master) may comprise multiple segments. Further, a bus matrix may include one or more of protocol conversion blocks, data width conversion blocks, frequency conversion blocks, data buffering blocks, etc., on these parallel data paths to fulfill prescribed system requirements.

As described above in conjunction with FIG. 1, each of at least a subset of the plurality of slave devices 206 through 218 preferably has a dedicated function(s) associated therewith. In this illustrative embodiment, for example, slave device 218 functions as an interrupt controller operative to route interrupts generated by all other slave devices to the master device 202. A first interrupt bus 224 connects the interrupt controller 218 with the other slave devices 206 through 216, and a second interrupt bus 226 connects the interrupt controller 218 with the master device 202. Buses 224 and 226 are used by the interrupt controller 218 to convey interrupts between the other slave devices 206 through 216 and the master device 202. Slave device 214 functions as a system control module operative to generate, among other signals, clock, reset and power enable signals for both the master and slave and/or interconnect devices. Slave device 216 functions as a watchdog timer operative to generate a reset signal (Wdg_reset) that is passed to the system control module 214 when an anomaly is detected in the system.

In order to avoid resetting the system each time an anomaly is detected, the hardware system 200 includes an error responder module (ERR_RSPNDR) 228, or alternative controller. The error responder module 228 is essentially a proxy controller device operative to receive status information relating to one or more IP devices (e.g., slave devices 206 through 218) through one or more corresponding signals (e.g., bus access status, power and clock enables). The term "IP device" in this context refers to the collection of slave devices 206 to 218 that are attached to interface 220. There may be other devices not explicitly shown that the error responder module 228 is not monitoring. Error responder module 228 is further operative to receive power domain status and clock enable status either from individual IP devices or from the system control module 214 configured to supply such status information. The error responder module 228 generates output response information which is preferably multiplexed with response information from each of at least a subset of the IP devices for isolation of one or more IP devices during a detected system anomaly.

As previously described, a malfunctioning (i.e., dysfunctional) IP device can be isolated by multiplexing the response information, generated by the error responder module 228 and conveyed by an error response interface 230 or alternative connection means, with response information from the IP device. Alternatively, all dysfunctional IP device transactions can be routed to the error responder module 228. To accomplish this, the error responder module 228 is operative to generate one or more control signals that are supplied to remap logic 232 (e.g., via remap pins interface 234, or an alternative connection arrangement), which in this embodiment resides in the SoC interconnect 204, to thereby bypass the malfunctioning IP device and/or bus transactions associated with the malfunctioning IP device.

In an alternative embodiment, the error responder module 228 is operative to receive IP device response data, through a programming interface, and to convey this data as at least part of the error response information (e.g., by multiplexing this response data with other status information from the IP devices and/or system control module 214) when the error responder module is supplied with status information indicating that the IP device is inactive. In this scheme, the remap logic 232 can be eliminated. In other embodiments, the error responder module 228 comprises a timer, or alternative counting means, which is operative to initiate an error response once a prescribed time period has elapsed after a request (e.g., read/write transaction request) has received no response. Here, a request is intended to include essentially any sort of request that would require a response, such as, for example, a read data request which requires read data to be returned, or a write data request that requires an acknowledgement that the data has been processed, although substantially all requests will typically require a response regardless of the request type.

Alternatively, in accordance with other embodiments, the error responder module 228 can be placed near the master device 202 on the path connecting the master device 202 and the SoC interconnect 204 (also referred to herein as a master-side responder), such as for those subsystem implementations in which the SoC interconnect 204 or some significant portion of an address map tree corresponding to the master device is able to be placed into an inactive or unresponsive state. In a slave-side responder implementation, the error responder module has access to the slave device select signals from the bus controller to know which slave device has been addressed. In a master-side responder implementation, the error responder module will require decoding logic operative to determine which slave device is being addressed for a given request; otherwise, no significant modification of the error responder module is required for this alternative approach. Placing the error responder module 228 near the master device 202 has a benefit of identifying the destined slave request, which is useful for multi-core (multiprocessor) systems, and covering all the slave devices, regardless of the structure of the interconnect 204, with a single instance of the error responder module.

At least a portion of the error responder module 228 may be implemented in hardware, such as, for example, in a manner consistent with other hardware IP devices, including, but not limited to, a universal asynchronous receiver/transmitter (UART), general purpose input/output (GPIO) port, timer, system control module, etc. The error responder module 228 is preferably connected to a first interface 236 (e.g., advanced peripheral bus (APB), not explicitly shown) for register programming, similar to the manner in which other IP devices in the system are programmed. The error responder module 228 connects to a second interface 238, which can be implemented as a master or a slave interface, that is operative to identify master/slave anomalies and to provide status information regarding such anomalies to the error responder module (e.g., as a control signal or alternative data). The response information generated by the error responder module 228 and conveyed by the response information interface 230 will be a function of the received anomaly status information. The error responder module 228 is adapted for connection with a third interface 240 through which status information from one or more IP devices is received. The error responder module 228 is also adapted for connection with a fourth interface 242 through which power and clock enables from the system control module 214 are received.

Figure 2B:
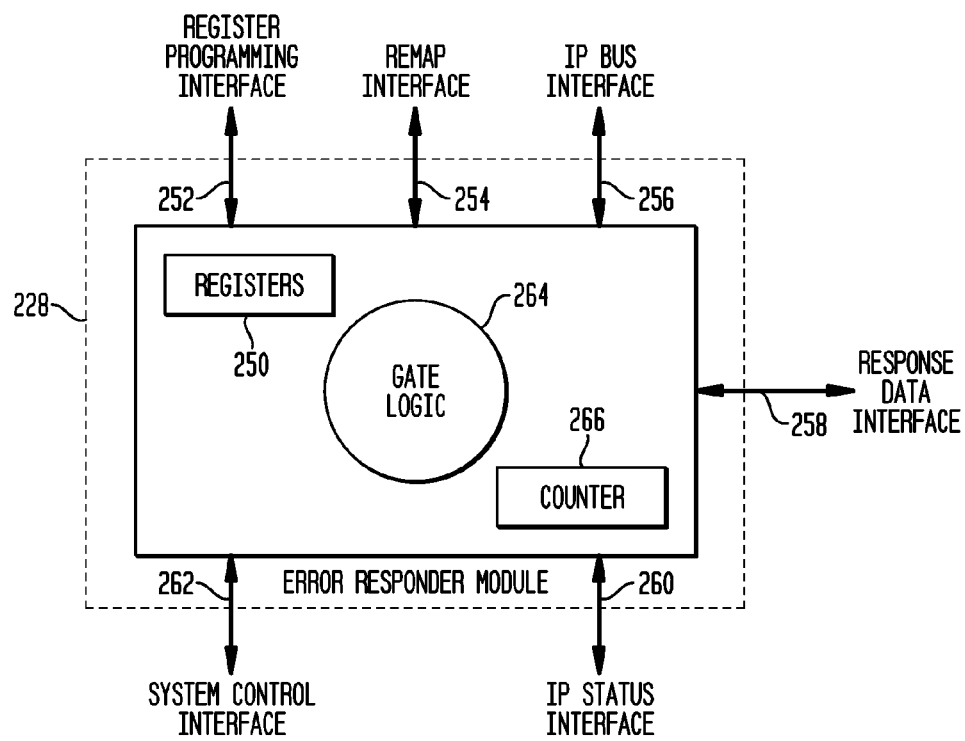
FIG. 2B is a block diagram depicting at least a portion of an exemplary error responder module suitable for use in the illustrative hardware system shown in FIG. 2A, according to an embodiment of the invention.

FIG. 2B is a block diagram depicting at least a portion of an exemplary error responder module 228 suitable for use in the illustrative hardware system 200 shown in FIG. 2A, according to an embodiment of the invention. With reference to FIG. 2B, the error responder module 228 preferably comprises one or more registers 250, a first interface 252, which may comprise interface 236 (FIG. 2A), adapted to receive at least one control signal for facilitating register programming, a second interface 254, which may comprise interface 234 (FIG. 2A), operative to generate control signals supplied to remap logic 232 for remapping access to one or more IP devices, a third interface 256 operative to receive IP bus transaction information from the master device to one of the one or more IP devices, which may comprise interface 238 (FIG. 2A), a fourth interface 258, which may comprise error response interface 230 (FIG. 2A), operative to convey error response data, a fifth interface 260, which may comprise interface 240 (FIG. 2A), coupled with at least one corresponding IP device and operative to receive status information regarding detected anomalies in the IP device, a sixth interface 262, which may comprise interface 242 (FIG. 2A), operative to receive information from the system control module 214 (e.g., power domain status and clock enable status from individual IP devices), a logic block 264 operative to coordinate with the registers and respective interfaces, and, optionally, at least one counter 266, or an alternative timing mechanism (e.g., timer), operative to initiate an error response once a prescribed time period has elapsed after a request (e.g., read/write transaction request) has received no response.

It is to be appreciated that at least a portion of the information conveyed by one or more of the interfaces 252 through 262 can be combined. For example, the power domain status and clock enable status for individual IP devices conveyed by interface 262 can be incorporated with the status information regarding detected anomalies in the IP device(s) conveyed by interface 260. Furthermore, the error responder module 228 can be associated with multiple IP devices, and logic 264 utilized in the error responder can be independent of a specific IP protocol.

By way of example only and without loss of generality, consider a situation in which a desultorily bus hang event occurs upon slave device 208 being accessed by the master device 202. In this scenario, a processor associated with the master device M0 (e.g., included in master device M0) will not be able to execute subsequent instructions, and the processor pipeline will be halted. This results in a deadlock condition whereby no active functionality is performed by the processor.

When an anomaly (e.g., a bus hung condition) is detected in slave device 208, the error responder module 228 receives status information from the corresponding IP device and/or the system control module 214 indicative of the anomaly. The error responder module 228 may identify a system anomaly in at least one of multiple ways. For example, in a first anomaly identification methodology, a slave device (e.g., slave device 208) associated with a dysfunctional IP device communicates status information regarding the anomaly (e.g., bus hung condition) to the error responder module 228. In a second anomaly identification methodology, a timer, or alternative measurement means, included in the error responder module 228 is initiated at the start of a given transaction. After a prescribed period of time has elapsed (time-out period) without receiving a response to the transaction, an anomaly is presumed to have occurred.

When an anomaly is detected, the error responder module 228 gathers power domain information relating to the dysfunctional IP device from the system control module 214. The error responder module 228 then generates response information, which may be one or more control signals conveyed by the response information interface 230, and is operative to complete the pending bus transaction by bypassing the dysfunctional IP device and/or interconnect without asserting the system reset line.

Concurrently, in accordance with illustrative embodiments, firmware (e.g., running on a processor in master device M0) analyzes the response information generated by the error responder module 228 to identify the issue causing the anomaly. Specifically, the error responder module 228 sends response data (via interface 230) to the master device M0. Upon receipt of the response data, the master device M0 enters into an exception routine, whereby the master device M0 analyzes the response data to determine the source and/or type of the anomaly. Once the anomaly has been identified, the firmware is operative to perform actions necessary to recover the dysfunctional IP device and/or interconnect. Such actions may include, but are not limited to, resetting (i.e., clearing) error function logic in the dysfunctional IP device and/or interconnect, and resetting the dysfunctional IP device and/or interconnect, such as by asserting a local reset line associated with the IP device or by shutting down power to the IP device (e.g., using the system control module 214, or an alternative power domain controller). When the dysfunctional IP device and/or interconnect cannot be recovered using these procedures, the firmware preferably programs the remap logic 232 to bypass error responder transactions relating to the dysfunctional IP device and programs (e.g., enables or reconfigures) alternative hardware to replace the non-recoverable IP device and/or interconnect, thereby allowing the system 200 to function normally.

FIG. 3 is process flow diagram depicting at least a portion of an exemplary method 300 for handling anomalies in a hardware system (e.g., system 200 shown in FIG. 2), according to an embodiment of the invention. In this method, an error responder module or proxy (e.g., error responder module 228 in FIG. 2) identifies a system anomaly in step 302. Such an anomaly may be characteristic of, for example, a scenario in which slave device access is pending indefinitely (i.e., transaction bus is hung). The error responder module, in accordance with embodiments of the invention, can identify the anomaly in at least one of a plurality of ways, including, for example, the slave device communicating dysfunction status corresponding to one or more IP devices to the error responder module, or using a timer operative to detect a prescribed time-out period after initiation of a transaction, as previously explained.

In step 304, the error responder module receives status information relating to the dysfunctional IP device(s) from a system controller (e.g., system control module 214 in FIG. 2), including, for example, power domain information for the dysfunctional IP device(s). The error responder module then completes the pending bus transaction in step 306 by bypassing the dysfunctional IP device and/or interconnect (e.g., SoC interconnect 204 in FIG. 2) using an error response (e.g., via error response interface 230 in FIG. 2) generated by the error responder module. In this manner, the method 300 is operative to cause the error responder module/proxy to send an error response for a dysfunctional IP device(s) and to isolate the dysfunctional IP device(s) without performing a system reset. This approach advantageously reduces the recovery time of the system when an anomaly occurs. The error responder module is preferably operatively coupled with a system power control module to dynamically respond to an IP device depending on the power mode state of the device.

Optionally, the method 300 facilitates system debugging and fault location efforts by sending one or more specific messages indicative of the system anomaly. Specifically, firmware performing at least a portion of the method 300 enters an abort routine, or alternative device recovery methodology, and analyzes error details in step 308. Based at least in part on the analysis of the error details, the firmware performs the necessary actions to recover the dysfunctional IP device(s) in step 310. Such actions may include, but are not limited to, resetting and/or clearing error function logic in the IP device, resetting the dysfunctional IP device, etc.

The method 300 checks to determine whether or not the dysfunctional IP device has been recovered in step 312. When the IP device has been recovered, no further action is required and the system continues to function in a normal manner in step 318. However, when the dysfunctional IP device has not been recovered by the actions performed in step 310, the firmware executing at least portions of method 300 is operative, in step 314, to program remapping logic (e.g., remap logic 232 in FIG. 2) associated with the error responder module to bypass at least a subset of all future transactions associated with the dysfunctional IP device. In the illustrative embodiment shown in FIG. 2, logic bits coupled with the bus interconnect (e.g., SoC interconnect 204 in FIG. 2) are remapped to bypass and/or block dysfunctional IP device transactions within the bus interconnect.

Alternatively, for embodiments which do not employ remap logic, rather than remapping future transactions associated with the dysfunctional IP device in step 314, these transactions are still routed to the dysfunctional IP device. However, response signals generated by the dysfunctional IP device are bypassed in step 314 with response signals generated by the error responder module.

Next, in step 316 the firmware executing at least portions of method 300 is operative to configure/reconfigure alternative hardware as may be required to perform one or more functions of the bypassed dysfunctional IP device. The system then continues to function normally in step 318, without the need to reset the entire system. In this manner, system recovery time is beneficially reduced.

It is to be appreciated that, while a single embodiment of the method is described in conjunction with FIG. 3, method 300 is not limited to performance of the steps in the specific order in which they are described. That is, the ordering of steps and/or operations associated with the embodiment(s) of the invention described herein may be altered while remaining within the intended scope of the invention.

As indicated above, embodiments of the invention can employ hardware or a combination of hardware and software (i.e., embodiments of the invention can be comprised of a first portion implemented in hardware and a second portion implemented in software). Software includes but is not limited to firmware, resident software, microcode, etc. One or more embodiments of the invention or portions thereof may be implemented in the form of an article of manufacture including a machine readable medium that contains one or more programs which when executed implement such method step(s); that is to say, a computer program product including a tangible computer readable recordable storage medium (or multiple such media) with computer usable program code stored thereon in a non-transitory manner for performing the method steps indicated. Furthermore, one or more embodiments of the invention or elements thereof can be implemented in the form of an apparatus including a memory and at least one processor (e.g., master device) that is coupled with the memory and operative to perform, or facilitate the performance of, exemplary method steps.

As used herein, "facilitating" an action includes performing the action, making the action easier, helping to carry out the action, or causing the action to be performed. Thus, by way of example only and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Yet further, one or more other embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 4:
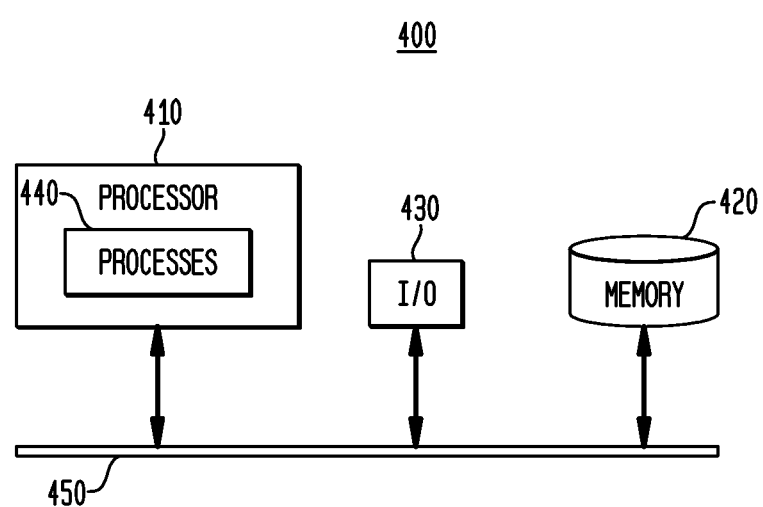
FIG. 4 is a block diagram depicting at least a portion of an exemplary processing system, formed in accordance with an embodiment of the invention.

Embodiments of the invention may be well-suited for use in an electronic device or alternative system (e.g., multilayer and multilevel interconnect systems, memory storage systems, etc.). For example, FIG. 4 is a block diagram depicting at least a portion of an exemplary processing system 400 according to an embodiment of the invention. System 400, which may represent, for example, a multilayer SoC interconnect, or a portion thereof, may include a processor 410, memory 420 coupled with the processor (e.g., via a bus 450 or alternative connection means), as well as input/output (I/O) circuitry 430 operative to interface with the processor. The processor 410 may be configured to perform at least a portion of the functions of the present embodiment of the invention (e.g., by way of one or more processes 440 which may be stored in memory 420 and loaded into processor 410), illustrative embodiments of which are shown in the previous figures and described herein above.

It is to be appreciated that the term "processor" as used herein is intended to include any processing device, such as, for example, one that includes a CPU and/or other processing circuitry (e.g., network processor, microprocessor, digital signal processor, etc.). Additionally, it is to be understood that a processor may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., display, etc.) for presenting the results associated with the processor.

Accordingly, an application program, or software components thereof, including instructions or code for performing the methodologies of embodiments of the invention, as described herein, may be stored in a non-transitory manner in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more microprocessors with associated memory, ASICs, FPGAs, functional circuitry, one or more operatively programmed general purpose digital computers with associated memory, etc). Given the teachings of embodiments of the invention provided herein, one of ordinary skill in the art will be able to contemplate other embodiments of the invention using the elements disclosed herein.

At least a portion of the techniques of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which IP devices may be employed. Suitable systems for implementing techniques of embodiments of the invention may include, but are not limited to, servers, personal computers, mobile phones, hard disk controllers, data storage networks, controller with a mass storage device(s) (having a separate power domain), etc. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. An apparatus for handling anomalies in a hardware system including a master device and at least one slave device coupled with the master device through an interconnect device, the apparatus comprising:
    at least one controller configured to receive status information relating to a first slave device, the status information being indicative of an anomaly present in at least one of the first slave device and the interconnect device, the controller being configured to generate output response information as a function of the status information relating to the first slave device, wherein the master device is configured to perform at least one action, responsive to the output response information, to recover the at least one of the first slave device and the interconnect device without resetting the hardware system to return to normal operation.

2. The apparatus of claim 1, further comprising logic circuitry configured to perform at least one of remapping on one or more transactions associated with the first slave device when the anomaly is detected, and bypassing the first slave device when the anomaly is detected.

3. The apparatus of claim 1, wherein the status information relating to the first slave device comprises at least one of power domain status and clock enable status corresponding to the first slave device.

4. The apparatus of claim 1, wherein the status information relating to the first slave device comprises information for characterizing the anomaly in the system, including at least one of power failure information, data loss information and information relating to a failure of a target device coupled to the first slave device.

5. The apparatus of claim 1, wherein the at least one controller is configured to multiplex the output response information with response information generated by the first slave device for isolating the first slave device.

6. The apparatus of claim 1, wherein the at least one controller comprises:
    at least one register configured to store information relating to the first slave device;
    a first interface adapted to receive at least one control signal for facilitating programming of the at least one register;
    a second interface adapted to receive bus transaction information associated with the first slave device;
    a third interface configured to generate response data for multiplexing with response data associated with the first slave device;
    at least a fourth interface coupled with the first slave device and adapted to receive status information regarding detected anomalies in the first slave device; and
    logic circuitry configured to coordinate with the at least one register and respective interfaces.

7. The apparatus of claim 6, wherein the hardware system includes a system control module operatively coupled with the master device, and wherein the at least one controller further comprises:
    a fifth interface configured to generate one or more control signals for remapping access to the first slave device; and
    a sixth interface adapted to receive at least one of power domain status and clock enable status from the first slave device.

8. The apparatus of claim 1, wherein the at least one controller comprises a counter configured to initiate an error response completing a pending bus transaction by bypassing the first slave device without asserting a system reset line in the hardware system once a prescribed time period has elapsed after a request sent to the first slave device has received no response from the first slave device.

9. The apparatus of claim 1, wherein the first slave device comprises an intellectual property (IP) device.

10. The apparatus of claim 1, wherein the controller is configured to isolate the first slave device in the hardware system when the anomaly is detected in the first slave device as a function of the output response information without resetting the hardware system to return to normal operation.

11. The apparatus of claim 10, wherein the controller is configured to isolate the first slave device by multiplexing response information generated by the controller and conveyed by an error response interface with response information generated by the first slave device.

12. The apparatus of claim 1, wherein the controller, upon detection of the anomaly, acquires power domain information relating to the first slave device from a system control module in the hardware system and is configured to generate the output response information and to complete a pending bus transaction by bypassing the first slave device without asserting a system reset line in the hardware system.

13. A method for handling anomalies in a hardware system including a master device and one or more slave devices coupled with the master device through an interconnect device, the method comprising the steps of:
   identifying an anomaly in the hardware system based at least in part on status information relating to a first slave device of the one or more slave devices;
   generating output response information as a function of the status information for at least one of identifying a dysfunctional slave device of the one or more slave devices; and
   performing at least one action to recover the dysfunctional slave device in response to the output response information without resetting the hardware system to return to normal operation.

14. The method of claim 13, wherein the steps of identifying the anomaly in the hardware system and generating output response information are performed by a proxy controller device in the hardware system.

15. The method of claim 13, further comprising isolating the dysfunctional slave device by multiplexing the output response information with response information from the dysfunctional slave device.

16. The method of claim 13, further comprising rerouting device transactions relating to the dysfunctional slave device to a proxy device in the hardware system.

17. The method of claim 16, wherein the step of rerouting device transactions relating to the dysfunctional slave device comprises generating one or more control signals supplied to remap logic in the interconnect device, and bypassing at least one of the dysfunctional slave device and bus transactions associated with the dysfunctional slave device as a function of the one or more control signals.

18. The method of claim 16, further comprising, upon detection of the anomaly in the hardware system, the proxy device acquiring power domain information relating to the dysfunctional slave device, generating response information, and completing a pending bus transaction by bypassing the dysfunctional slave device without asserting a system reset line in the hardware system.

19. The method of claim 13, wherein the status information relating to the first slave device comprises at least one of power domain status and clock enable status corresponding to the first slave device.

20. The method of claim 13, wherein the status information relating to the first slave device comprises information for characterizing the anomaly in the system, including at least one of power failure information, data loss information and information relating to a failure of a target device coupled to the first slave device.

21. The method of claim 13, wherein the at least one action comprising performing system debugging and fault location analysis as a function of the output response information indicative of the anomaly in the hardware system, and initiating a device recovery routine based at least in part on the fault location analysis.

22. The method of claim 13, wherein the at least one action comprising performing at least one of clearing error function logic in the dysfunctional slave device and resetting the dysfunctional slave device to recover the dysfunctional slave device.

23. The method of claim 13, further comprising determining whether the dysfunctional slave device has been recovered and, when the dysfunctional slave device has not been recovered, performing at least one of programming remap logic to thereby bypass transactions associated with the dysfunctional slave device, and configuring an alternative slave device in the hardware system to replace the dysfunctional slave device.

* * * * *